March 28, 1950     O. BRAY     2,502,124
ADJUSTABLE MITER GAUGE FOR SAW TABLES
Filed April 22, 1946     3 Sheets-Sheet 1
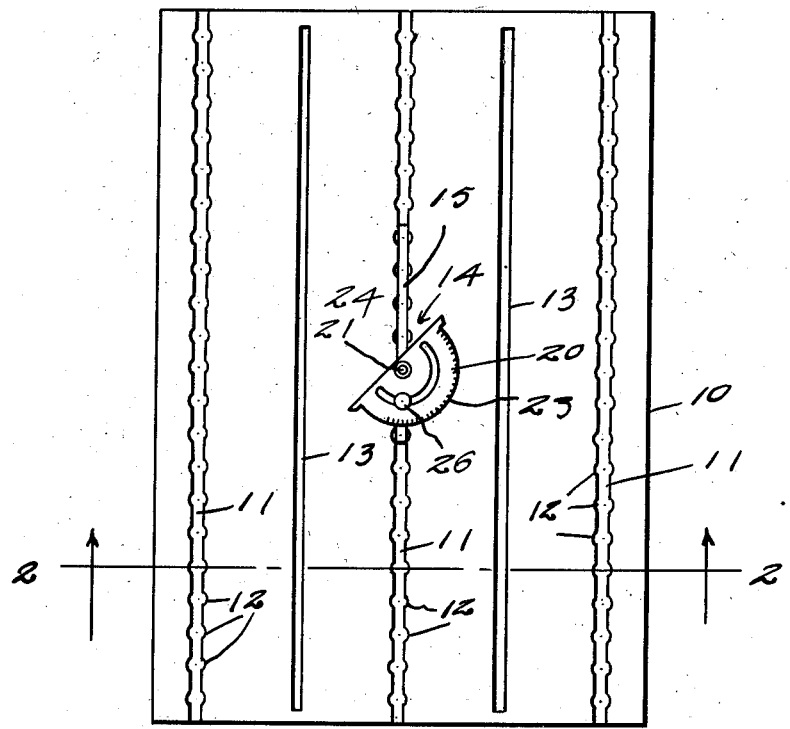
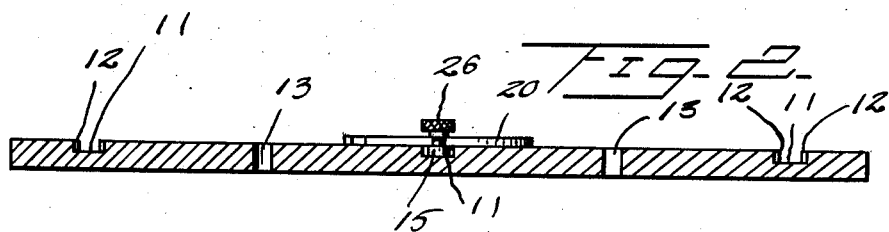
Inventor
Overton Bray
By Randolph & Beavers
Attorneys March 28, 1950     O. BRAY     2,502,124
ADJUSTABLE MITER GAUGE FOR SAW TABLES
Filed April 22, 1946     3 Sheets-Sheet 2
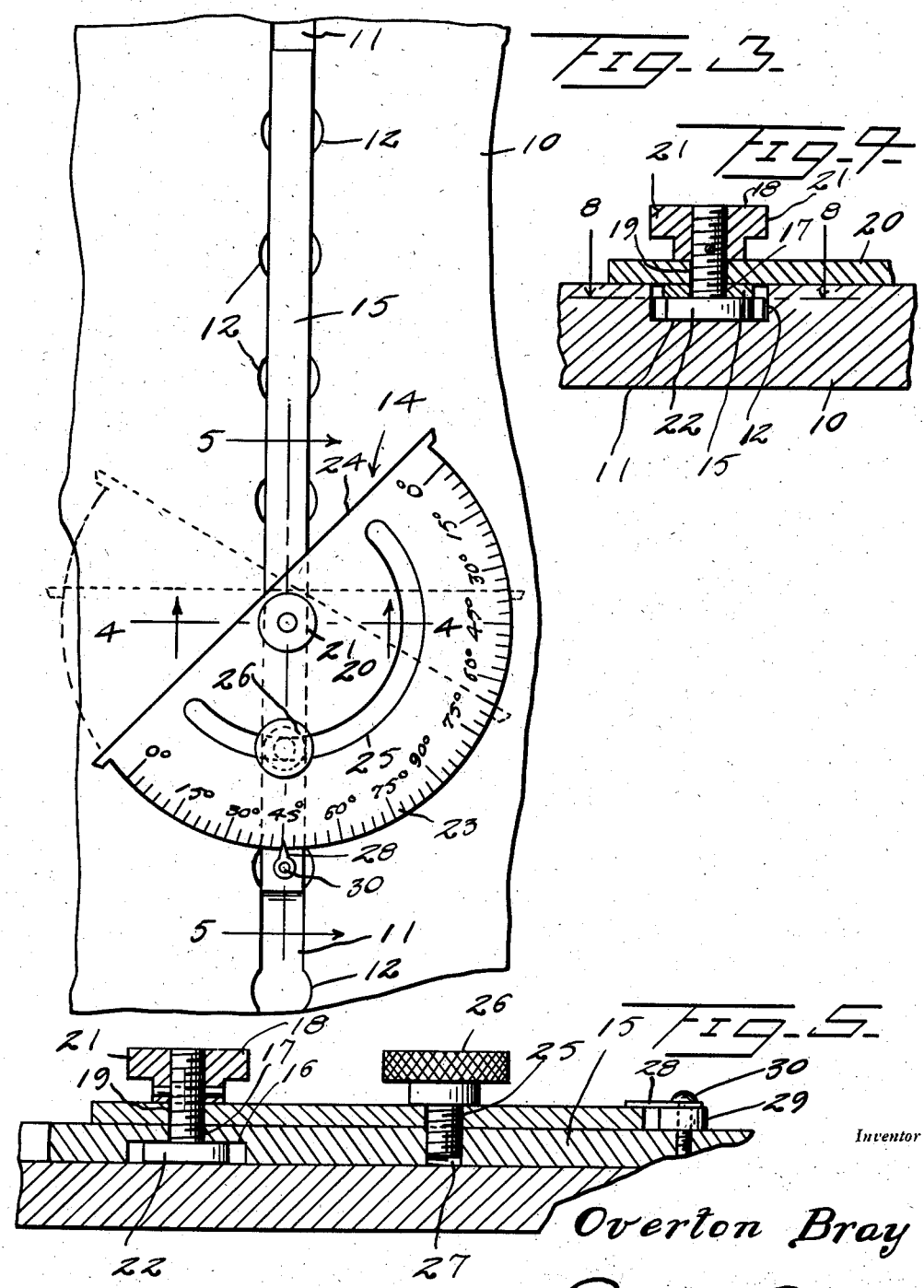
Inventor
Overton Bray
By Randolph & Beavers
Attorneys

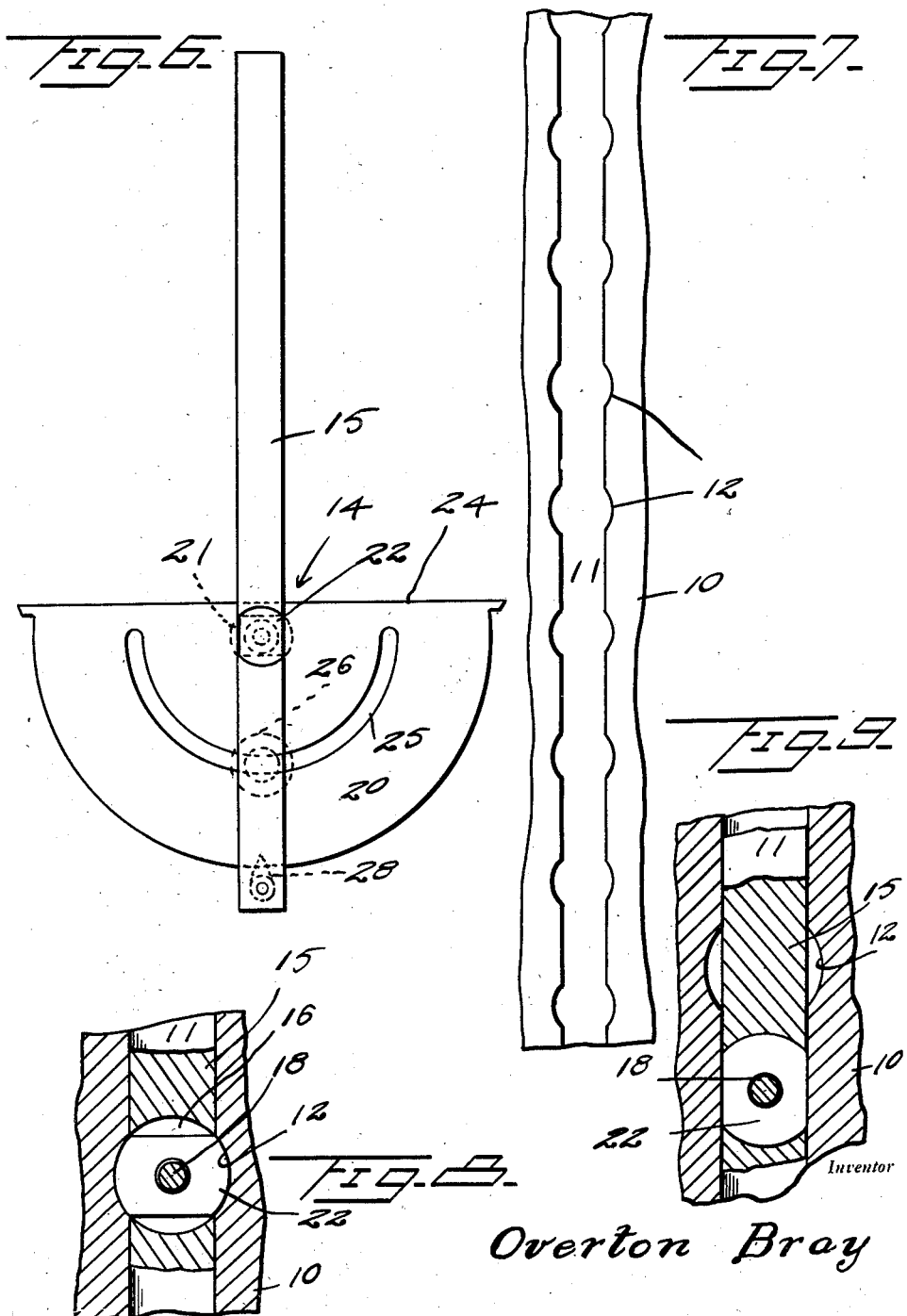

Patented Mar. 28, 1950

2,502,124

UNITED STATES PATENT OFFICE 2,502,124

ADJUSTABLE MITER GAUGE FOR SAW TABLES

Overton Bray, Rupert, Idaho

Application April 22, 1946, Serial No. 664,068

4 Claims. (Cl. 143—169)

1

This invention relates to an improved construction of miter gauge for saw tables, and more particularly to a novel construction of saw table top and miter gauge for use therewith and which is constructed and arranged so that the miter gauge may be adjustably fixed with respect to the saw table or mounted for sliding movement relatively thereto to function in conjunction with a fixed or sliding rotary saw.

Another object of the invention is to provide a miter gauge having means for cooperation with a part of a saw table for fixedly positioning the gauge relatively to the table.

Other objects and advantages of the invention will hereinafter become more fully apparent in the following description of the drawings, which illustrate a preferred embodiment thereof, and wherein:

Figure 1 is a plan view of the improved construction of saw table and adjustable miter gauge for use therewith;

Figure 2 is a cross sectional view taken substantially along the line 2—2 of Figure 1;

Figure 3 is an enlarged fragmentary top plan view of the gauge and a portion of the table top;

Figures 4 and 5 are sectional views taken substantially along the planes as indicated by the lines 4—4 and 5—5, respectively, of Figure 3;

Figure 6 is a bottom plan view of the gauge; and

Figure 7 is a fragmentary top plan view of a portion of the table top;

Figure 8 is a horizontal sectional view taken substantially along the plane of the line 8—8 of Figure 4, and Figure 9 is a similar view but showing the gauge in a released position.

Referring more specifically to the drawings, the numeral 10 designates generally the improved saw table top which is provided in its upper surface with a plurality of parallel grooves 11 which extend from end to end thereof and which are provided with a plurality of spaced, laterally enlarged portions 12 having arcuate sides. The top surface of the table 10 may be provided with one or any number of the grooves 11. The table top 10 is also provided with one or a plurality of longitudinally extending slots 13 which open vertically therethrough and which extend to adjacent the ends thereof. As illustrated, the table 10 is provided with two slots 13 equally spaced between the three grooves 11, but the table may be provided with one or any number of such slots, each of which is adapted to accommodate the upper portion of a blade

2 of a rotary saw, not shown, which may be fixedly disposed therein or mounted for sliding movement longitudinally thereof, as disclosed in my prior United States Letters Patent, No. 2,313,617, issued March 9, 1943, and entitled "Saw bench."

As best seen in Figures 3 and 6, the miter gauge designated generally 14 includes an elongated strip 15 forming the base thereof which is of substantially the same thickness as the depth of the grooves 11 and which is slightly narrower than said grooves to slidably fit therein. As seen in Figure 5, the bar or strip 15 is provided with a recess 16 in a portion of its underside and with an opening 17 which communicates with the central portion of the recess 16 and which opens outwardly of the upper sides thereof. A stem 18 is journaled in the opening 17 and in an opening 19 of a protractor plate 20. The stem 18 is provided with a knurled thumb knob 21 on its upper end which is disposed above the plate 20 and the stem has an elongated head 22 on its opposite, lower end which is rotatably disposed in the recess 16. The head 22 is best seen in Figure 8 and is provided with substantially parallel side edges which are spaced apart a distance slightly less than the width of the groove 11 and substantially equal to the width of the bar 15. The head 22 is provided with rounded ends and is of a length slightly less than the width of the recess portions 12 of the groove 11, so that by rotation of the thumb knob 21 and stem 18, when the head 22 is in transverse alignment with a recess portion 12, the head 22 may be turned to position its rounded ends in opposed recesses 12, as seen in Figure 8, for fixedly positioning the miter gauge 14 relatively to the table 10.

The protractor plate 20, as best seen in Figure 3, is provided with indicia 23 on its upper side and around the arcuate edge thereof. The indicia 23 preferably includes graduations marked in degrees at 15 degree intervals beginning with 90 degrees at the center thereof and ending at a zero degree marking at each end of the scale. The zero degree markings are in alignment with the axis of the opening 19 which axis is parallel to the straight edge 24 of the plate 20. The plate 20 is provided with an arcuate slot 25 which is concentric with its arcuate edge. As best seen in Figure 5, a thumb screw 26 extends loosely through the slot 25 and threadedly engages an opening or recess 27 in the bar 15. An indicating pointer 28 is supported on a block or platform 29 and is secured thereto by a screw 30 which extends through the parts 28 and 29 and is anchored in the bar 15. The pointer 28, as best seen in Figure 3, is disposed over the graduations of the indicia bearing portion 23 for indicating the angle of the straight edge 24 with respect to the axis of the bar 15.

From the foregoing it will be readily apparent that the protractor plate or apron 20 may be turned to any desired angle and locked by tightening the clamp screw 26. A piece of lumber, not shown, can then be placed with one edge thereof against the straight edge 24, and with the head 22 in its position of Figure 9, the miter gauge can be moved lengthwise of the table top 10 by sliding the bar or base 15 in its groove 11 for feeding the lumber to a stationary revolving saw blade, not shown, which projects upwardly through one of the slots 13. By positioning the head 22 in transverse alignment with one of the enlarged portions 12 of the groove 11 and by the simple expedient of turning the thumb knob 21 a quarter turn or 90 degrees, the head 22 can be moved to the position, as seen in Figure 8, to lock the miter gauge 14 against sliding movement in the groove 11, so that the straight edge 24 will form an abutment for holding the lumber at an angle while a saw blade, which is mounted for longitudinal movement in one of the slots 13, is fed to the lumber.

Thus it will be readily apparent that the saw table 10 and miter gauge 14, as previously described, provides a structure which may be utilized either in conjunction with a fixed saw or a slidably mounted saw. The stem 18 which carries the retaining head 22 also functions as the journal or pivot for the protractor apron 20.

Various modifications and changes are contemplated and may obviously be resorted to without departing from the spirit and scope of the invention as hereinafter defined by the appended claims.

I claim as my invention:

1. In a miter gauge for saw tables, a saw table having a top provided with a longitudinally disposed slot for receiving a rotary saw blade, said table top having a longitudinal groove provided with longitudinally spaced enlarged portions; a miter gauge including an elongated bar forming the base thereof, a protractor plate pivotally connected to said bar, means for adjustably clamping the protractor plate with respect to the bar, said bar being constructed and arranged to slidably engage the groove, and means carried by the bar and movable with respect thereto for selectively engaging both sides of one of the enlarged portions of the groove for adjustably anchoring the miter gauge against movement relatively to the groove.

2. In combination with a miter gauge for saw tables having an elongated, recessed base bar and a swivelly mounted elongated anchoring head disposed in the recess thereof; a saw table having a top provided with an elongated groove for slidably receiving said base bar, and said groove being provided with longitudinally spaced oppositely disposed enlarged portions for selectively receiving the ends of the anchoring head for anchoring the miter gauge with respect to the groove.

3. In combination with a saw table having a table top provided with an elongated groove having longitudinally spaced oppositely disposed enlarged portions; a miter gauge including a bar, forming the base thereof, said bar being constructed and arranged to slidably engage said groove, and anchoring means normally disposed in a nested position within the bar, said anchoring means being movable ito a position for selective engagement with oppositely disposed enlarged portions of the groove for fixedly positioning the miter gauge with respect thereto.

4. A miter gauge as in claim 3, said bar having a recessed portion, and said anchoring means comprising an elongated head nested in said recessed portion when in an inoperative position, and a thumb knob disposed above the bar and having a stem connected to the anchoring head and by means of which said head is moved into an operative position, transversely of the bar for engagement with an enlarged portion of the groove.

OVERTON BRAY.

REFERENCES CITED

The following references are of record in the file of this patent:

UNITED STATES PATENTS

| Number | Name | Date |
|---|---|---|
| 145,354 | Loetscher | Dec. 9, 1873 |
| 327,651 | Bradshaw | Oct. 6, 1885 |
| 812,574 | Linton | Feb. 13, 1906 |
| 1,007,180 | Brown | Oct. 31, 1911 |
| 2,010,882 | Ocenasek | Aug. 13, 1935 |
| 2,313,617 | Bray | Mar. 9, 1943 |